United States Patent
Pittard et al.

(10) Patent No.: US 7,705,746 B2
(45) Date of Patent: Apr. 27, 2010

(54) SIMPLIFIED CONTROL SYSTEM FOR ELECTRONIC MEDIA

(75) Inventors: William B. Pittard, Los Angeles, CA (US); Scott Cernetic, Redondo Beach, CA (US); Duncan Wain, Palos Verdes Estates, CA (US)

(73) Assignee: Scope Seven Inc., El Segundo, CA (US)

( * ) Notice: Subject to any disclaimer, the term of this patent is extended or adjusted under 35 U.S.C. 154(b) by 850 days.

(21) Appl. No.: 10/597,528

(22) PCT Filed: Feb. 1, 2005

(86) PCT No.: PCT/US2005/002843

§ 371 (c)(1),
(2), (4) Date: Sep. 28, 2006

(87) PCT Pub. No.: WO2005/074565

PCT Pub. Date: Aug. 18, 2005

(65) Prior Publication Data

US 2008/0238708 A1    Oct. 2, 2008

Related U.S. Application Data

(60) Provisional application No. 60/541,466, filed on Feb. 2, 2004.

(51) Int. Cl.
  *G05B 19/02*    (2006.01)
  *G08C 19/00*    (2006.01)
  *G08C 19/12*    (2006.01)
  *G08G 5/00*     (2006.01)
(52) U.S. Cl. ............................. 340/825.22; 340/825.69; 340/825.72; 341/175; 341/176; 341/177; 345/666
(58) Field of Classification Search ....................... None
See application file for complete search history.

(56) References Cited

U.S. PATENT DOCUMENTS 4,111,421 A    9/1978    Mierzwinski (Continued)

FOREIGN PATENT DOCUMENTS

CA    2329693 A1    6/2002

(Continued)

OTHER PUBLICATIONS

M. Broersma, "Interactive DVD format gets broad support", ZDNet UK News, Hardware Chips, Sep. 26, 2002: http://news.zdnet.co.uk/hardware/chips/0,39020354,2122929,00.htm.
Taylor, Jim, "DVD Demystified," McGraw-Hill, Second Edition, 2001, 6 pgs.

*Primary Examiner*—Daniel Wu
*Assistant Examiner*—Fekadeselassie Girma
(74) *Attorney, Agent, or Firm*—Darby & Darby PC; John W. Branch (57) ABSTRACT

A control system with a simplified control device (10) for direct selection of electronic media operations, and for programmed navigation through the content without using dedicated navigation functions of a media player. The simplified control device (10) includes a limited number of keys, comprising direct-select keys (20-26) and navigation keys (30-36), which transmit programmable number key signals rather than dedicated key signals. Direct-select keys (20-26) are visually associated with icons displayed by the medial player by shape, color, and/or the like. The icons are dynamically associated with portions of content and/or software instructions stored on a medium, such as a DVD. Activating a direct-select key (20-26) cause the media player to access the associated content and/or instructions. The simplified remote control device (10) also includes navigation keys (30-36) associated with software instructions stored on the DVD, so that navigation operations are consistent for any media player that reads from the DVD. Dedicated keys can also be included.

20 Claims, 6 Drawing Sheets

U.S. PATENT DOCUMENTS

| | | | |
|---|---|---|---|
| 4,490,810 A | 12/1984 | Hon | |
| 4,728,949 A | 3/1988 | Platte et al. | |
| 5,081,534 A | 1/1992 | Geiger et al. | |
| 5,386,251 A | 1/1995 | Movshovich | |
| 5,500,794 A * | 3/1996 | Fujita et al. | 700/83 |
| 5,699,065 A | 12/1997 | Murray | |
| 5,745,192 A | 4/1998 | Bialobrzewski | |
| 5,855,483 A | 1/1999 | Collins et al. | |
| 5,949,407 A * | 9/1999 | Sato | 345/169 |
| 6,069,672 A | 5/2000 | Claassen | |
| 6,264,559 B1 | 7/2001 | Lawrence et al. | |
| 6,400,280 B1 * | 6/2002 | Osakabe | 340/825.25 |
| 6,556,255 B1 | 4/2003 | Kim et al. | |
| 6,587,067 B2 | 7/2003 | Darbee et al. | |
| 6,590,505 B1 | 7/2003 | Matsui et al. | |
| 6,597,374 B1 | 7/2003 | Baker et al. | |
| 6,633,281 B2 | 10/2003 | Lin et al. | |
| 6,692,358 B2 | 2/2004 | Lawrence et al. | |
| 6,765,557 B1 * | 7/2004 | Segal et al. | 345/173 |
| 6,788,241 B2 | 9/2004 | Arling et al. | |
| 7,432,909 B2 * | 10/2008 | Yamamoto et al. | 345/158 |
| 2002/0089427 A1 * | 7/2002 | Aratani et al. | 340/825.72 |
| 2003/0141987 A1 * | 7/2003 | Hayes | 340/825.72 |
| 2004/0054826 A1 | 3/2004 | Kavanagh | |
| 2005/0014563 A1 | 1/2005 | Barri | |
| 2005/0024229 A1 * | 2/2005 | Chuey | 340/825.72 |
| 2005/0026699 A1 | 2/2005 | Kinzer et al. | |
| 2005/0054407 A1 | 3/2005 | Kinzer et al. | |
| 2005/0216843 A1 * | 9/2005 | Masters et al. | 715/740 |

FOREIGN PATENT DOCUMENTS

| | | |
|---|---|---|
| EP | 0 435 370 A2 | 7/1991 |
| IL | 0140813 A | 2/2002 |
| JP | 8195823 A | 7/1996 |
| JP | 2003111164 A2 | 4/2003 |
| WO | WO-01/35664 A2 | 5/2001 |
| WO | WO-03/029948 A1 | 4/2003 |
| WO | WO-03/067543 A2 | 8/2003 |

* cited by examiner

SIMPLIFIED CONTROL SYSTEM FOR ELECTRONIC MEDIA

FIELD OF THE INVENTION

The present invention is directed to an interactive media control system, and more specifically to a simplified control system that associates a limited set of keys with command signals to enable dynamic interaction with multi-media content through consistent and cursorless navigation.

BACKGROUND OF THE INVENTION

Remote control devices are commonly used to control electronic devices such as televisions (TVs), radios, video cassette recorders (VCRs), digital versatile disc (DVD) players, digital video recorders (DVRs), and the like. Remote control devices usually include arrow keys, a rocker switch, or a thumbstick for navigating through options or menus displayed on a screen. The options or menu are typically displayed with icons or text that has no relation to any of the keys on the remote control. Remote control devices also usually include some reserved navigation keys that enable a user to choose content. Conventional reserved navigation keys have predefined command signals. For example, if a user presses a "Back" key on a conventional remote control device, a predefined command signal is transmitted to the DVD-player. The DVD player recognizes the command signal and returns to a previous portion of the DVD content. However, not all DVD players use the command signal for the exact same function. Some DVD players interpret the signal as a command to return to the beginning of a current section of the content. Other DVD players interpret the signal as a command to return to the beginning of a prior section of the content.

Universal remote controls can be programmed to emulate one or more native remote controls of manufacturers' devices. For example, universal remote controls include command sets for TVs and DVD players, so that a user can control both devices with a single universal remote control. Such universal remote controls usually include command sets for a variety of TV and DVD player manufacturers. When a user programs a universal remote control, the user typically selects a command set corresponding to one manufacture's device, such as one manufacturer's DVD player. Some universal remote controls also enable a user to switch between multiple DVD players. In any case, each command set typically includes predefined command signals that are reserved for conventional navigation keys. The predefined navigation commands are typically assigned to corresponding, dedicated navigation keys. Dedicated keys increase the complexity of native remote controls and universal remote controls.

Also, a universal remote does not make navigation consistent between differing DVD players. For example, the Back key on a universal remote control will not cause differing DVD players to perform the same Back operation. For instance, use of a universal remote control will not cause all DVD players to return to the beginning of a current section of the media content. Thus, current universal remote controls may be able to control multiple devices, but current universal remote controls do not necessarily provide consistent control of differing devices. This may cause confusion for users with multiple devices, such as different models of DVD players in multiple rooms of a house, in one or more vehicles (e.g., minivan DVD players), and/or other uses.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods and/or devices. The following detailed description is, therefore, not to be taken in a limiting sense.

Briefly stated, the invention is directed to a control system that associates a limited set of keys with non-reserved command signals to enable dynamic interaction with multi-media content through navigation of programmed menu options. In general, dedicated keys, with dedicated command signals that control dedicated functions embedded in a media access device are not needed. Instead, programmable keys are associated with command signals that can control dynamically changeable operations that are accessed and executed by the media access device along with multi-media content. Even predefined navigation operations are implemented with the programmable keys and the embedded code accessed by the media access device, rather than with dedicated keys and dedicated functions of the device. However, dedicated keys can be included with the control system to activate reserved operations, such as Back and Forward operations of a network browser program.

Illustrative Simplified Remote Control

An exemplary embodiment is described in terms of a simplified remote control system for interaction with multi-media content reproduced by a conventional DVD player, although the invention is not so limited. The invention can be applied to any control device that can control any of a variety of electronic devices and media access means, such as DVD players, DVRs, set top boxes, game devices, audio equipment, computing devices, network access devices, lights, machines, and the like. The following exemplary embodiment is specifically described in terms of a remote control device for use by a child to control a DVD player for interaction with entertainment and/or educational content stored on a DVD.

Figure 1:
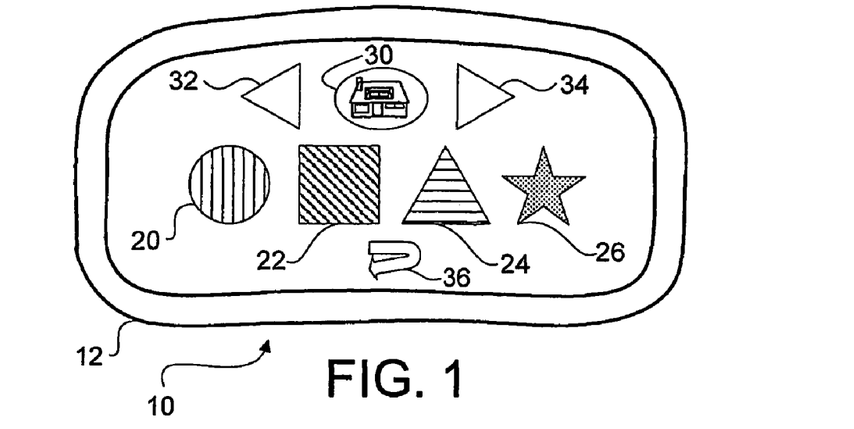
FIG. 1 is a top view of a simplified remote control according to one embodiment of the invention.

FIG. 1 is a top view of a simplified remote control 10 according to one embodiment of the invention. Simplified remote control 10 includes a housing 12 that is sized and shaped to be easy for a child to use. Simplified remote control 10 may be sized and shaped for a child to freely hold in one or two hands, to set on a surface, and/or to be integrated into another device. Simplified remote control 10 also includes any number of keys to activate predefined and/or programmable operations. The invention can be applied to remote control devices that use conventional keys and corresponding dedicated and programmable operations. However, simplified remote control 10 is one example of, but not limited to, a specialized remote control device with a limited set of keys that makes it easy for a child to interact with software and media content that conforms to an industry standard DVD-Video specification. Details on the DVD-Video specification are available via the DVD Forum (www.dvdforum.org) and the DVD Format/Logo Licensing Corporation (www.dvdfllc.co.jp), both of Tokyo Japan.

To interact with software controlled media content, a number of keys, referred to as direct-select keys 20-26, can be dynamically associated with operations that change throughout the course of a DVD program. For example, each key shape and/or color can be associated with a similarly shaped and/or colored icon displayed on a TV to enable a user to select from a plurality of operations programmed along with DVD media content. Each icon may be associated with a predefined portion of media, such as a video clip, and/or associated with an operation to be performed by the DVD player. Depressing a direct-select key, causes the DVD player to execute a programmed DVD operation. Such operations can include jumping to a particular location on the DVD and playing the content at that location, switching audio streams such as a different language, or other operations. This direct-select navigation does not require cursor-based navigation to reach the desired content. For example, conventional control systems typically require the user to manipulate arrow keys or a thumbstick to move a highlighting cursor over menu items, up and down a hierarchical menu structure, or through drop-down menus. The user usually presses the enter key once the user navigates to the desired operation. However, direct-select navigation enables the user to directly access the desired content with one click of one key.

In addition, a number of navigation keys 30-36 can be associated with navigation operations defined by programs on the DVD, rather than using conventional dedicated navigation functions that are embedded in the DVD player. Using consistent programs on the DVDs enables a user to navigate through the DVD media content in a consistent manner regardless of the make or model of DVD player. A Back key 32 can be used to activate a program from the DVD that causes the DVD player to return to the beginning of a prior content section. Whereas, a repeat key 36 can be used to activate a program from the DVD that causes the DVD player to return to the beginning of a currently viewed content section. These keys will consistently activate the same programs and cause the same operations, regardless of which DVD player is running the DVD.

Similarly, a Forward key 34 can be used to consistently cause the DVD player to skip to the beginning of the next content section, rather than skip the whole next content section. These navigation operations can be relative to the level of a current content section. For example, if the current content section is at a chapter level, the program can interpret Forward key 34 as a command to skip to the next chapter. However, if the current content section is at a scene level, the program can interpret Forward key 34 as a command to skip to the next scene. A Home key 30 can be used to cause the DVD player to jump to a most recent menu, rather than all the way to a top menu. If desired, the disc program can be coded to produce the opposite operations, and/or other operations. However, the operations will be consistent, regardless of which DVD player runs the disc program.

Activating programmed navigation operations and direct-select operations is performed with programmable number key codes. Software provided on a DVD enables the DVD player to interpret a received number key code as a command to perform a consistent navigation operation or another operation that is currently associated with a selected key. Depressing a key on simplified remote control 10 causes one or more transmitters to transmit a number key code to a receiver in the DVD player. Predefined codes can also be used with dedicated keys on the remote control to activate predefined operations, such as predefined navigation operations of a browser program, a predefined pause operation, a predefined stop operation, and the like.

Figure 2:
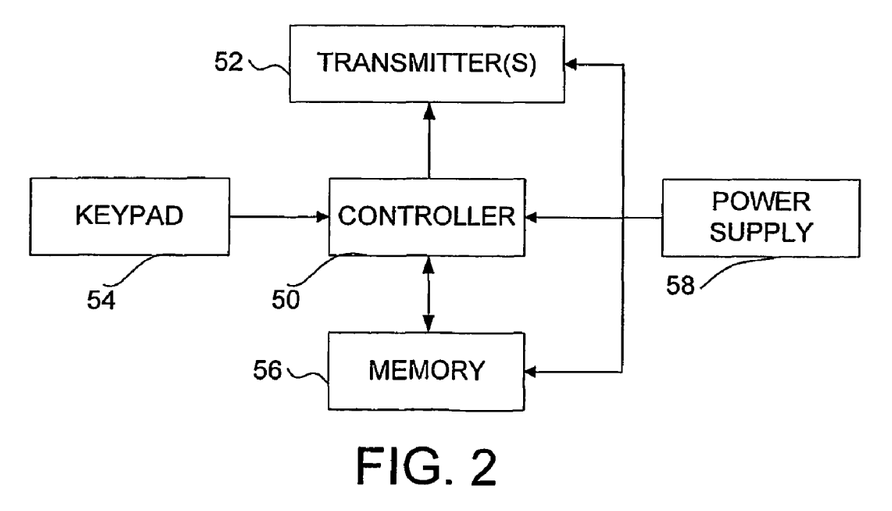
FIG. 2 shows a functional block diagram of an exemplary simplified remote control, according to one embodiment of the invention.

FIG. 2 shows a functional block diagram of an exemplary simplified remote control, according to one embodiment of the invention. The simplified remote control may include many more or fewer components than those shown. The components shown, however, are sufficient to disclose an illustrative embodiment for practicing the invention. The simplified remote control includes a controller 50 that coordinates remote control processes. Controller 50 is in communication with one or more transmitters 52, such as infrared transmitters, radio frequency (RF) transmitters, wired communication interfaces, and the like. If multiple transmitters are used, they can be connected in serial or parallel, but parallel connections prevent failure of remaining transmitters if one transmitter fails. Controller 50 is also in communication with a keypad 54, which includes the keys illustrated and discussed with regard to FIG. 1. Keypad 54 can include multiple types of keys on multiple faces of the remote control. A memory 56 provides permanent and temporary storage for instructions and data used by controller 50. A power supply 58, such as a battery, provides power to other components of the remote control.

Illustrative Media Control

Figure 3:
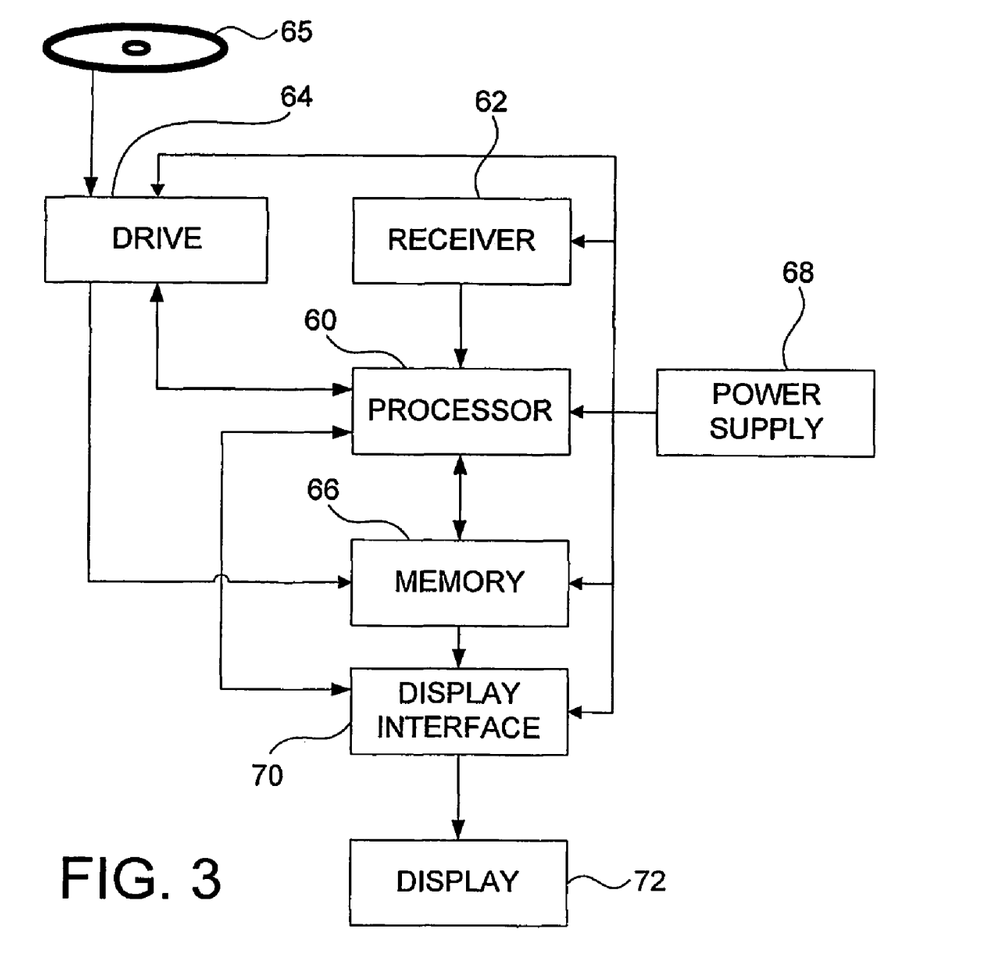
FIG. 3 shows a functional block diagram of an exemplary DVD player.

FIG. 3 shows a functional block diagram of an exemplary DVD player. The DVD player may include many more or fewer components than those shown. The components shown, however, are sufficient to disclose an illustrative embodiment for practicing the invention. The DVD player includes a processor 60 that coordinates media playing processes. Processor 60 is in communication with one or more receivers 62, such as infrared receivers, RF receivers, and the like. Processor 60 is also in communication with a drive 64, which may be internal or external. Drive 64 can include a permanent medium, such as a magnetic disk, and/or a removable medium 65, such as an optical DVD. Permanent or removable medium stores content and machine instructions used by processor 60. The content and/or machine instructions could also be accessed from a remote source through a communication network (not shown), such as from a cable service provider, a streaming media provider, and the like. A memory 66 can also provide permanent and/or temporary storage for instructions and data used by processor 60. A power supply 68, such as a battery, provides power to other components of the remote control. Processor 60 and/or memory 66 are further in communication with a display interface 70, which communicates image data to a display 72, such as an external TV and/or an integrated monitor. The exemplary DVD player may also include an audio interface, speakers, an LED display, status lights, auxiliary ports, and/or other components.

Figure 4A:
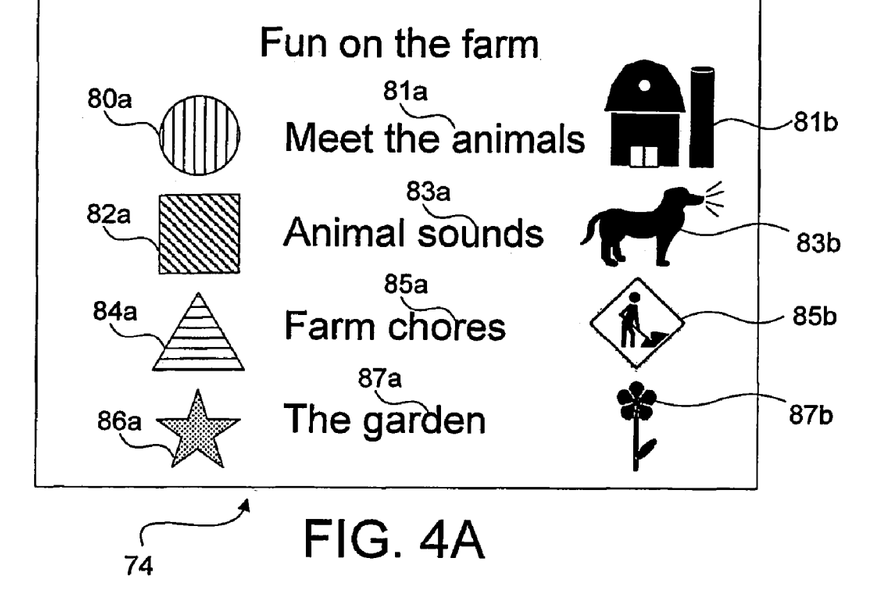
FIG. 4A is a sample display of a menu from which a user may directly select access to other menus and/or additional multi-media content.

FIG. 4A is a sample display 74 of a menu from which a user may directly select access to other menus, additional multimedia content, and/or other operations. The menu of this embodiment is comprised of content stored on a removable medium, such as a DVD. In this embodiment, controlling software is also obtained from the DVD and instructs the DVD player to retrieve and display the content as shown in sample display 74. Included in the content are a set of icons 80-86, which are displayed with a shape and/or color similar to keys 20-26 of simplified remote control 10 shown in FIG. 1. Icons 80a-86a of FIG. 4A may be associated with textual descriptions 81a-87a and/or graphics 81b-87b, respectively. Icons 80a-86a can also be associated with audio descriptions. Each textual description, audio description, and/or graphic indicates another menu level, an activity, a portion of multimedia content, an action, and/or other data or operation that is accessible if a user activates a corresponding key on the simplified remote control that has the similar shape and/or color as the associated icon. For example, text 82a and graphic 8b indicate that the user can access a menu of animal sounds if the user depresses direct-select key 22 on simplified remote control 10 that corresponds to icon 82.

Depressing a direct-select key causes simplified remote control 10 to transmit a signal corresponding to a programmable number key of a native remote control device. For instance, depressing direct-select key 22 causes simplified remote control 10 to transmit a signal corresponding to programmable number key 5 of a remote control device that is native to the DVD player being used to display the content. The DVD player receives the signal and determines that the signal corresponds to programmable number key 5. The DVD player notifies the controlling software that programmable number key 5 was depressed. The controlling software then executes instructions associated with programmable number key 5. In this case, the controlling software executes a LinkPGCN instruction, which conforms to the DVD-Video specification and causes the DVD player to link to a specific program chain. The program chain causes the DVD player to access and display another portion of content from the DVD. In the above example, the other portion of content comprises a menu of animal sounds.

Figure 4B:
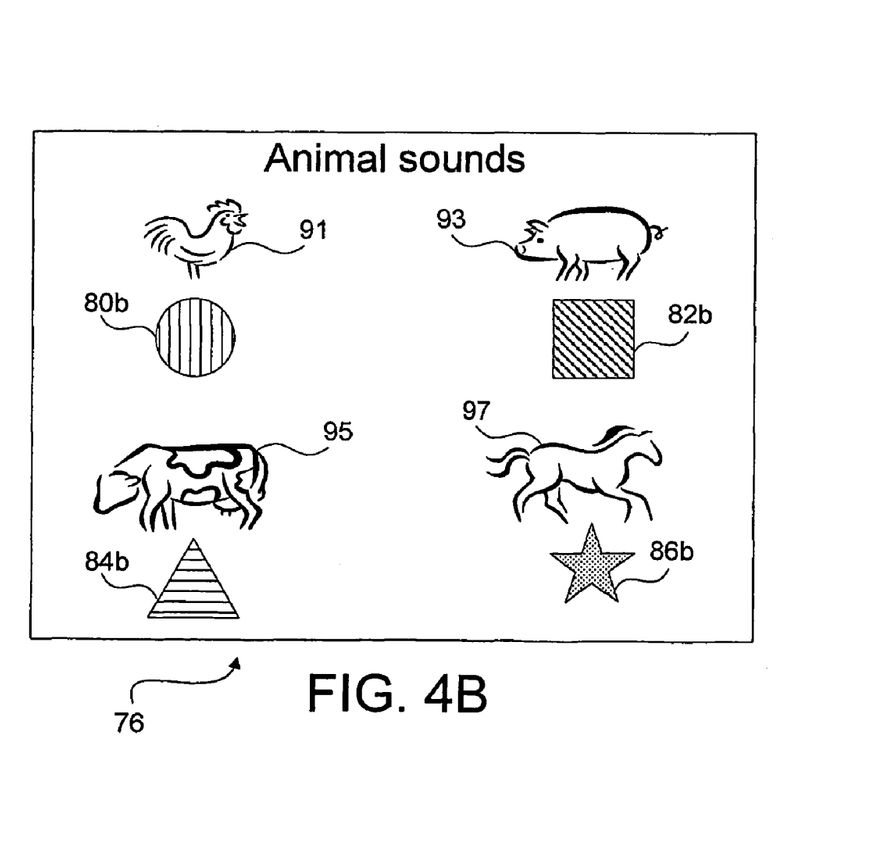
FIG. 4B is a sample display of a menu from which a user may directly select access to audio content of animal sounds.

FIG. 4B is a sample display 76 of a menu from which a user may directly select access to audio content of animal sounds. Icons 80b-86b are displayed with a shape and/or color similar to direct-select keys 20-26 of simplified remote control 10 shown in FIG. 1. Icons 80b-86b of FIG. 4B may be associated with corresponding textual descriptions, audio descriptions, and/or graphics 91-97. Each textual description, audio description, and/or graphic indicates an animal for which audio content is available. For example, the user can access and hear a chicken sound if the user depresses direct-select key 20 on simplified remote control 10 that corresponds to icon 80b.

Depressing direct-select key 20 causes simplified remote control 10 to transmit a signal corresponding to programmable number key 4. The DVD player notifies the controlling software that programmable number key 4 was depressed, and the controlling software executes the associated instructions. In this case, the controlling software executes a JumpVTS_TT instruction, which causes the DVD player to jump to a particular video title set and title on the DVD. In the above example, the specified video title set and title can include visual and/or audio media assets of a crowing chicken, which is played by the DVD player.

Other types of operations can also be associated with the direct-select keys. For example, one of the direct-select keys could be associated with a multi-angle operation that enables the user to switch to different views of the crowing chicken. Another direct-select key could be associated with an audio stream operation that enables the user to switch to different crowing sounds of different chicken breeds. A further example includes a subpicture operation that activates a subdisplay over the primary display. Yet another example is a settings operation that enables the user to change settings of variables such as the score for an interactive game. Conceptually, any operation can be associated with a direct-select key, including navigation operations, which could enable the navigation keys to be eliminated and thereby control sequencing. This might be useful in an educational embodiment, which could require a student to complete a set of operations before providing navigation operations that might enable the user to go back to a previous portion or skip forward to a different portion of content, such as a reward game. Alternatively, one or more existing navigation keys can be dynamically locked out be associating the navigation key with a null operation.

However, separate navigation keys are generally provided, and each navigation key is also associated with a programmable number key, which is used to execute one or more instructions provided on the DVD (or accessible from another source). In this way, the controlling software can provide consistent navigation, regardless of which DVD player is executing the controlling software. Some or all of the navigation keys may be inactivated during the display of certain portions of the content. For example, while a menu of multiple selections is displayed, the controlling software may ignore the Forward navigation key, because it may be unclear which portion of content should be accessed. Alternatively, the controlling software may interpret the Forward navigation key to access the each selectable portion of content in a sequence.

Logic

Although the controlling software can be run on any DVD player, the simplified remote control must be able to transmit programmable number key signals that a particular DVD player will recognize. Many DVD players require differing signals and/or sequences of signals to recognize programmable number keys. Thus, the simplified remote control must be set to transmit signals associated with the user's particular model of DVD player.

Figure 5A:
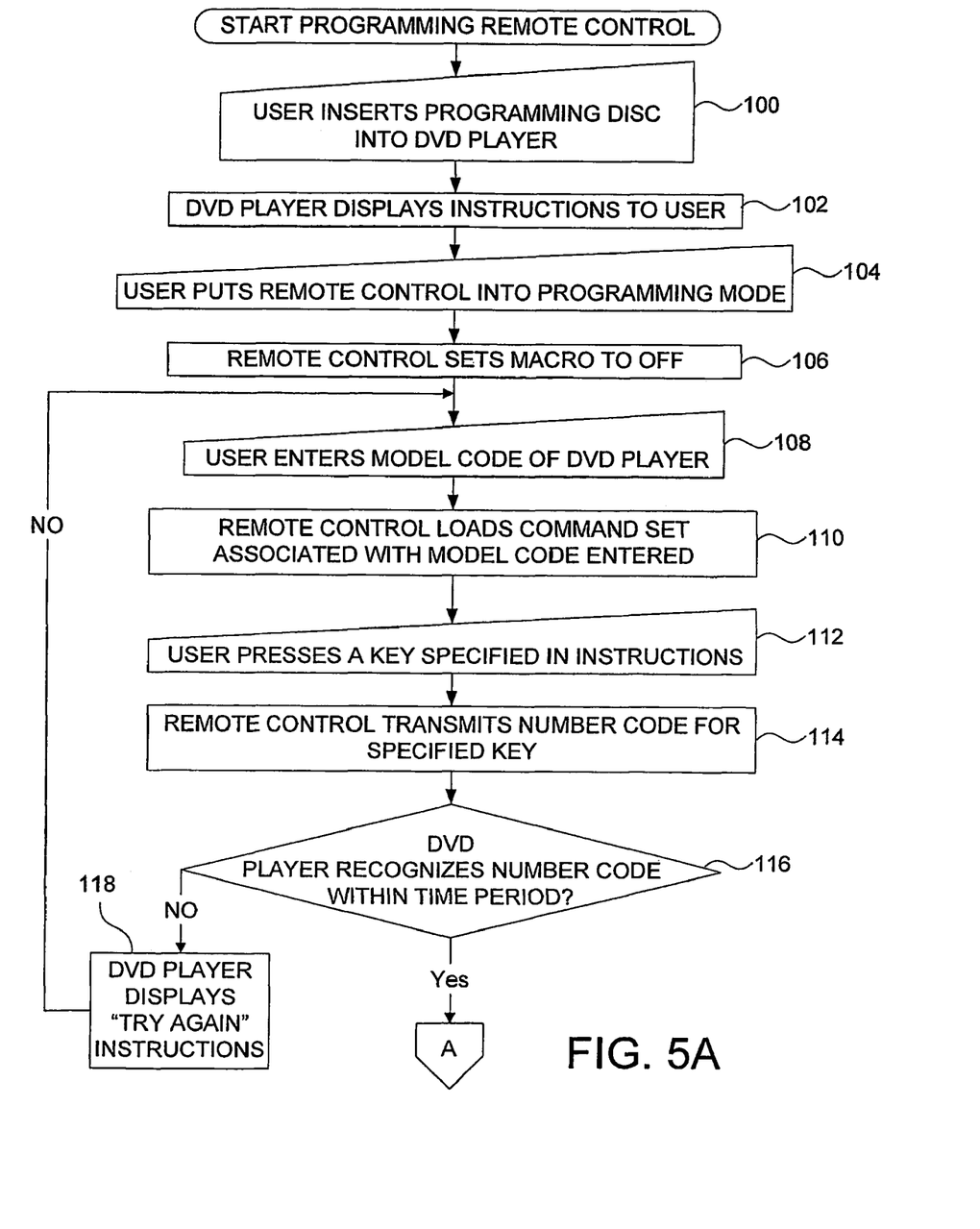
FIG. 5A is a flow diagram illustrating exemplary logic for setting the simplified remote control to use signals compatible with a user's particular model of DVD player.

FIG. 5A is a flow diagram illustrating exemplary logic for setting the simplified remote control to use signals compatible with a user's particular model of DVD player. At an operation 100, the user inserts a programming DVD into the DVD player. The programming DVD includes software and content for instructing the user on how to "program" the simplified remote control. The programming software and content can be stored on its own DVD or included on a DVD with other content, such as entertainment content. At an operation 102, the DVD player loads and executes the programming software, which causes the DVD player to display text and/or audio/visual instructions to the user. The instructions include information on how the user should set the simplified remote control into a programming mode, which the user does at an operation 104. Activating programming mode can be implemented with a switch provided on the simplified remote control, pressing a combination of keys on the simplified remote control, or other methods.

Once in the programming mode, the simplified remote control switches a macro setting to off. The macro setting indicates whether one or more additional command signals must be transmitted with a programmable number key signal. For example, some DVD players require an "Enter" signal following a number key signal before these DVD players will accept the number key signal as a valid command from a remote control. When using the native remote control with one of these DVD players, a user would press a number key and also press an Enter key. Although this two-step process may prevent unintended number key commands, this two-step process can be cumbersome for some users, especially children. The two-step process is also inconsistent with other DVD players that do not require the additional Enter signal. To make use of the simplified remote control consistent for any DVD player, the simplified remote control can be programmed with a macro setting that will automatically send the additional command signal(s) if needed. Initially, however, the macro setting is set to off.

At an operation 108, the user enters a model code into the simplified remote control. The model code identifies the make and model of the DVD player with which the simplified remote control will interface. The user may enter the model code with the navigation keys and/or the direct-select keys. Alternatively, the simplified remote control can be equipped with a secondary keypad that may be hidden within a covered portion of the simplified remote control. Based on the model code entered, the simplified remote control accesses its memory at an operation 110 for a corresponding command set. This access may be performed with a look-up table, as a calculation based on the model code, or other access method.

At an operation 112, the user then presses a key that was specified in the instructions that were displayed to the user. For example, the instructions may ask the user to press the Repeat key as a test. At an operation 114, the simplified remote control determines the number key value associated with pressed key (as defined by the command set of the model code), and transmits the corresponding number key signal to the DVD player.

At a decision operation 116, the DVD player receives the number key signal and determines whether the signal is recognized by the DVD player. If the DVD player does not recognize the number key signal, the DVD player will ignore it. Alternatively, the DVD player may interpret the number key signal as a command other than the intended command, which may cause the DVD player to perform an unexpected action. This would indicate to the user that the entered model code was not correct. If the DVD player does not react at all to the number key signal for a predetermined period, the software instructions cause the DVD player to access and display instructions at an operation 118, which tell the user to try a different model code. However, if the DVD player recognizes the number key signal, the DVD player notifies the software of the number received. Additional logic is continued in FIG. 5B via a connector A.

Figure 5B:
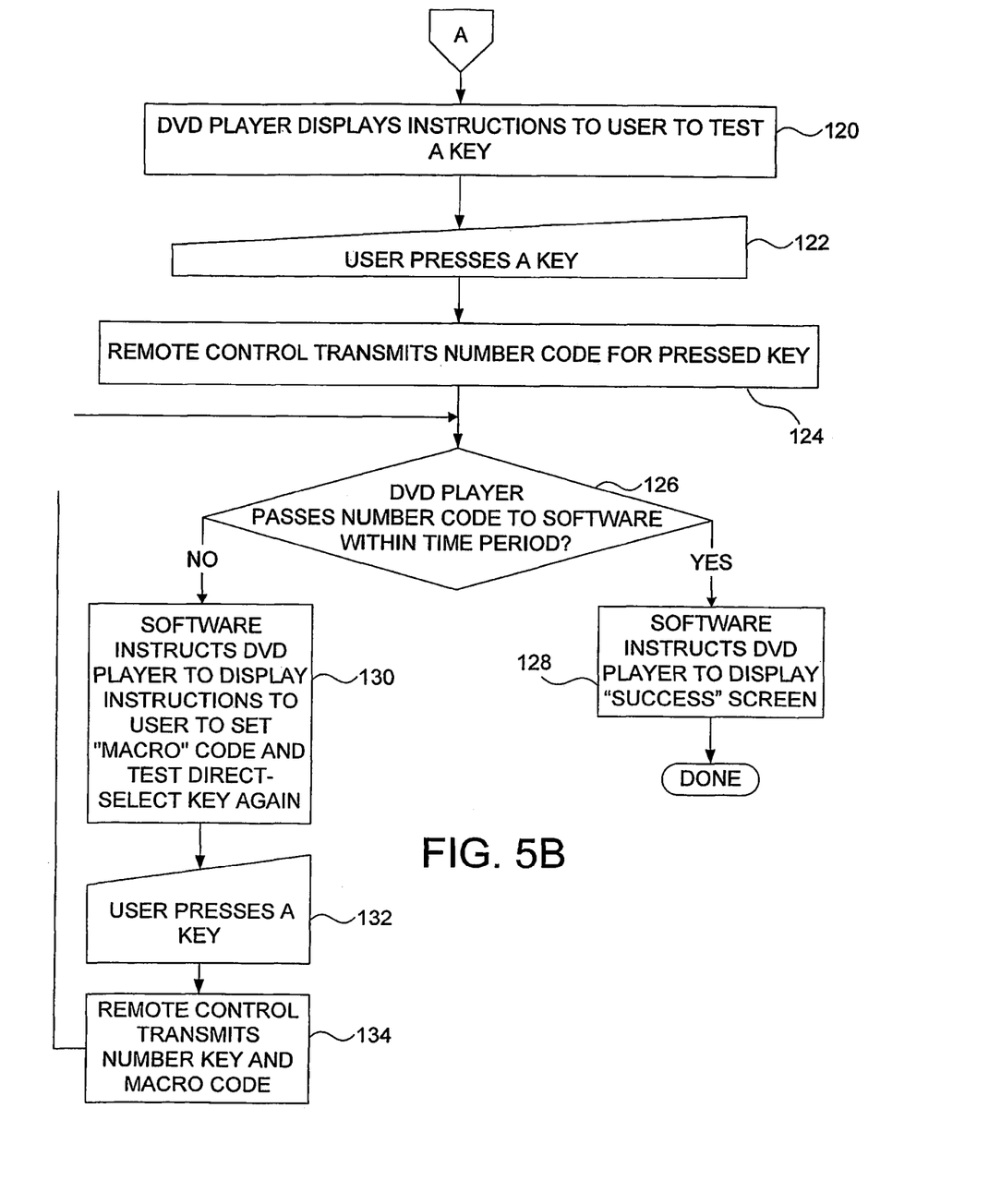
FIG. 5B is a flow diagram illustrating exemplary logic for setting the simplified remote control to transmit one or more additional commands along with a number key signal for certain models of DVD players.

FIG. 5B is a flow diagram illustrating exemplary logic for setting the simplified remote control to transmit one or more additional commands along with a number key signal for certain models of DVD players. At an operation 120, the software that was read from the DVD causes the DVD player to access and display content that instructs the user to test a key on the simplified remote control, such as one of the direct-select keys or one of the navigation keys. The software also causes the DVD player to start a timer. The user presses the key, at an operation 124. Accordingly, the simplified remote control determines the corresponding number key code and transmits the number key code signal to the DVD player.

At a decision operation 126, the DVD player determines whether it has received a valid number key command and can pass the received number key code to the software that was read from the DVD. If the DVD player is a model that does not require an additional command signal, such as an Enter signal, the DVD player will immediately relay the received number key code to the software. In that case, the software causes the DVD player to access and display a "Success" screen, which indicates to the user that the simplified remote control is properly set. The software may be defined to react only to a specific number key code or to any of the number key codes.

However, if the DVD player is a model that requires an additional command signal, such as an Enter signal, the DVD player will not be capable of relaying only the number key code to the software, because the DVD player will be expecting the additional command signal. In that case, the software timer will run until it expires. When the software timer expires, the software causes the DVD player to access and display alternate content that instructs the user to set a "Macro" code in the simplified remote control, and to then to retest the key. The Macro code can be set by a switch on the simplified remote control, by pressing a combination of keys, and/or by other methods. After setting the Macro code, the user presses a key at an operation 132 to repeat the test. At an operation 134, the simplified remote control determines the corresponding number key code and transmits the number key code signal to the DVD player. The simplified remote control also transmits the additional command signal, such as the Enter signal. At decision operation 126, the DVD player receives the number key code signal and the additional command signal, which this model of DVD player recognizes as a valid and complete command. The DVD player can then relay the number key code to the software, which reacts by instructing the DVD player to access and display the Success content at operation 128.

Those skilled in the art will recognize that other methods of programming the remote control are possible, such as simply having the user cycle through model codes, wherein some of the model codes correspond to command sets that already include the macro setting to cause the Enter command to be transmitted with a key number code. Those skilled in the art will also recognize that a counter can also be used to detect multiple user tests. After multiple failures, the software may instruct the DVD player to access and display content that instructs the user to try a different model code and/or to seek additional help.

Figure 6:
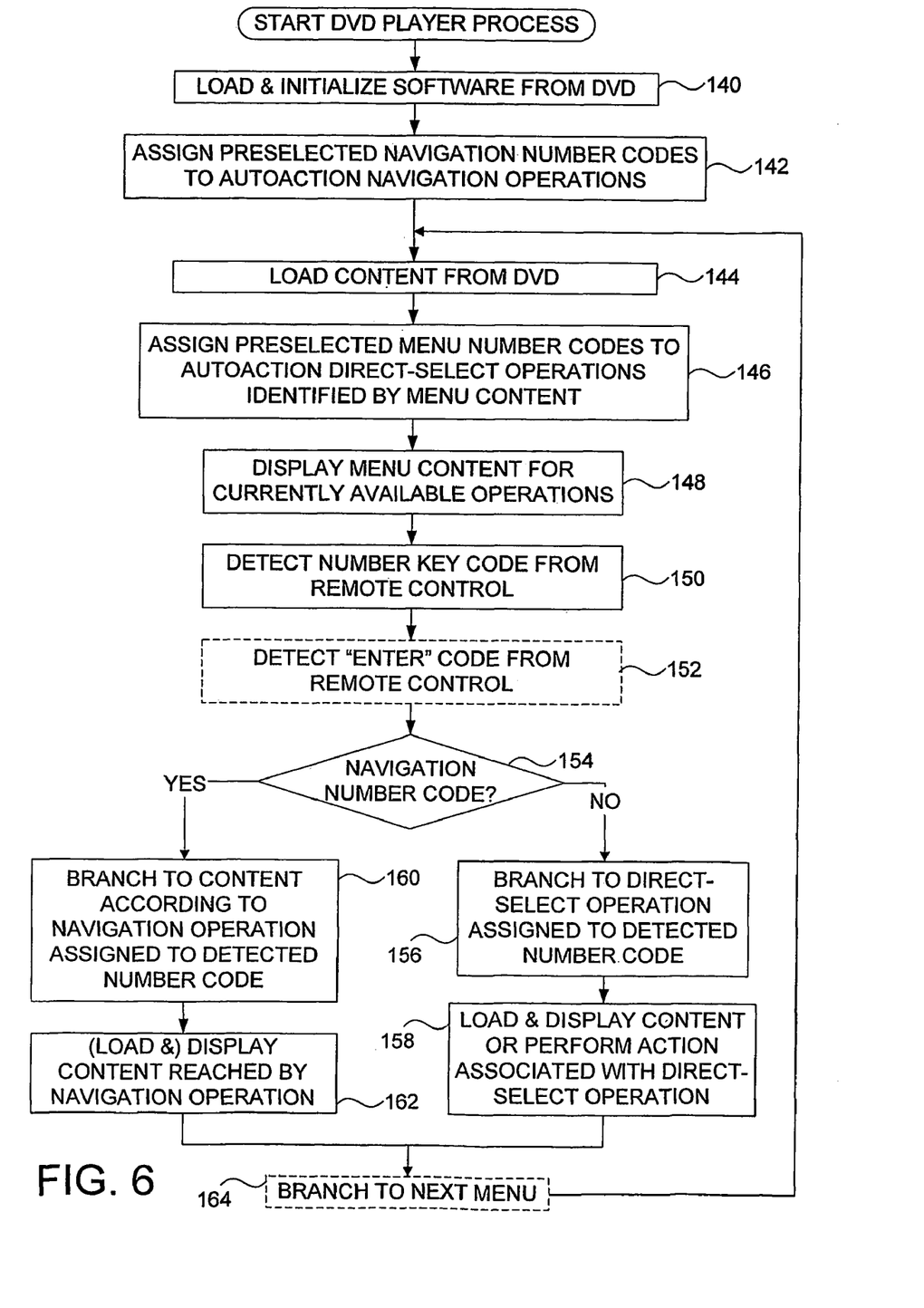
FIG. 6 is a flow diagram illustrating exemplary logic performed by the DVD player according to software instructions and content stored on the DVD.

FIG. 6 is a flow diagram illustrating exemplary logic performed by the DVD player according to software instructions and content stored on the DVD. At an operation 140, the DVD player loads and initializes the software from the DVD. Initialization can include allocating memory, assigning variables, and the like. For embodiments that do not include a removable DVD, operation 140 can include accessing and obtaining the software, such as from a remote electronic device through a network connection. At another initial operation 142, the software associates a subset of the number key codes with navigation operations controlled by the software. This subset can be referred to as navigation number codes. The corresponding navigation operations can be referred to as autoaction navigation operations, because the navigation operations can be implemented with autoaction functions defined by the DVD-Video specification.

In one embodiment, the programmable number key code 1 is used as a navigation number code to indicate the Back operation. The Back operation can be implemented with a "Mov GPRM10" autoaction function, which moves a pointer to a program chain corresponding to the beginning of a section of content that is prior to a current section of content. Other examples include using number key code 2 as a navigation number code to indicate the "Home" operation, using number key code 3 as a navigation number code to indicate the "Forward" operation, and using number key code 8 as a navigation number code to indicate the "Repeat" operation. During operation 142, the Repeat operation can also be set as a default operation, which may be equivalent to the Enter function for many conventional remote controls and DVD players. The Repeat key could then be used as an Enter key if the software ever called for an Enter command.

At an operation 144, the software instructs the DVD player to access and load content from the DVD. Initial content can comprise a menu including a number of content assets such as a background, an audio/visual sequence, and icons that are similar in color and/or shape to the direct-select keys. The software also associates another subset of the number key codes with direct-select operations at an operation 146. This second subset can be referred to as menu number codes, which are associated with the direct-select keys on the simplified remote control. Similar to the autoaction navigation operations, the corresponding direct-select operations can be referred to as autoaction direct-select operations, because the direct-select operations can also be implemented with autoaction functions defined by the DVD-Video specification.

While the autoaction navigation operations will perform the same functions regardless of the displayed content, the software can dynamically change the autoaction direct-select operations, depending on the menu level and/or activities made available to the user. Each menu number code is associated with an autoaction direct-select operation that is relevant to the current menu level. This dynamic assignment of autoaction direct-select operations was illustrated by the different options made available to the user in the displays of FIGS. 4A and 4B. When the menu number codes are dynamically assigned, the software instructs the DVD player to display the current menu content at an operation 146. The displayed icons are associated with currently available autoaction direct-select operations, such as those shown in FIG. 4A.

When a user presses one of the keys, and the simplified remote control transmits a number key code signal, the DVD player detects the number key code at an operation 150. Depending on the setting of the simplified remote control, the DVD player may also detect an Enter code at an optional operation 152. As long as the simplified remote control is properly programmed, the DVD player recognizes the number key code and relays it to the software.

At a decision operation 154, the software determines whether the received number key code is one of the navigation number codes. If the received number key code is not a navigation number code, the software determines which of the menu number codes is associated with the received number key code. At an operation 156, the software branches to the corresponding autoaction direct-select operation, which comprises a sub-module of one or more instructions. The instructions cause the DVD player to access and present content at an operation 158, such as a next menu, a multi-media performance, and the like. As indicated above, operation 158 can also comprise an action such as switching view angle, audio stream, subpicture stream, variable settings, and the like.

Conversely, if the received number key code is a navigation number code, the software determines which navigation number code is associated with the received number key code. At an operation 160, the software branches to the corresponding, which comprises a sub-module of one or more instructions for implementing the desired navigation. The instructions cause the DVD player to access and present content reached by the autoaction navigation operation. For instance, the instructions may cause the DVD player to access and display a prior section of content if the Back key was pressed.

After performing the navigation operation or presenting the direct-select content, the software may optionally branch to a next menu at an operation 164. The next menu may be identified in the instructions of the autoaction navigation operation or the autoaction direct-select operation. Software control then return to operation 144 to load the next menu content and continue until selects an Exit operation provided by the software.

The above specification, examples and data provide a complete description of the manufacture and use of the composition of the invention. For example, the remote control device can be adapted to control access to markup language content through a network. The remote control device could be used in place of a keyboard and/or mouse, which may be easier for children, seniors, and/or disabled users. The software associated with the direct-select keys and the navigation keys could also provide parental control and/or other controlled access to web content and/or other media. Since many embodiments of the invention can be made without departing from the spirit and scope of the invention, the invention resides in the claims hereinafter appended.

What is claimed as new and desired to be protected by Letters Patent of the United States is:

1. A control system comprising:
   a transmitter for transmitting command signals to a media control system that executes machine instructions associated with media content, wherein the machine instructions can be selectively associated with the command signals, and wherein the media content stored on a removable disc includes at least one of a graphic, a shape, a color, text, and audio data;
   a direct-select key in communication with the transmitter and having a property that is replicated in an icon on a display of the media control system, wherein the property associates the direct-select key with the icon on the display such that activation of the direct-select key causes the transmitter to transmit a first command signal to instruct the media control system to initiate an operation that is selectively associated with the icon, and wherein the icon is provided by the media content stored on a removable disc; and
   a navigation key in communication with the transmitter, activation of the navigation key causing the transmitter to transmit a second command signal to instruct the media control system to perform a navigation operation that is defined by the machine instructions such that the navigation operation will be the same for any of a plurality of media control systems which access the machine instructions.

2. The control system of claim 1, wherein the transmitter comprises one of an infrared transmitter and a radio frequency transmitter.

3. The control system of claim 1, wherein the property is at least one of a shape and a color.

4. The control system of claim 1, wherein activation of the direct-select key causes the transmitter to transmit the first command signal to instruct the media control system to initiate one of a menu, a media asset, a change in a setting, and a navigation operation.

5. The control system of claim 1, wherein the navigation operation comprises one of a back operation to a prior section of content, a repeat operation to a beginning of a current section of content, a forward operation to a next section of content, and a home operation to activate a prior level menu.

6. The control system of claim 1, wherein an additional command signal can be selected to be transmitted with each of the first command signal and the second command signal for those media control systems that require the additional command signal.

7. The control system of claim 1, further comprising a memory storing a plurality of selectable sets of command signals that correspond to a plurality of media control systems wherein the control system can be set to use one of the plurality of selectable sets for transmitting the first and second command signals.

8. The control system of claim 1, wherein the machine instructions conform to a digital versatile disc (DVD) specification.

9. the control system of claim 1, wherein the control system replaces a native remote control device that was designed specifically for use with the media control system and which includes predefined keys which when activated, causes predefined command signals to be transmitted to the media control system to perform predefined operations.

10. The control system of claim 1, further comprising a housing that is sized and shaped to be held with one of one and two hands and wherein the transmitter, the direct-select key, and the navigation key are exposed through orifices in the housing.

11. The control system of claim 1 further comprising at least one of:
additional direct-select keys and additional navigation keys such that a total number of keys is within a number permitted by a DVD video specification for programmable number keys; and a dedicated key that activates a predefined operation of the media control system.

12. A method for controlling operations associated with electronic media content stored on a removable disc comprising:
providing a control device that communicates with a media content access device, wherein the control device includes:
a direct-select key associated with a first command signal that can be communicated from the control device to the media content access device upon activation of the direct-select key and wherein the first command signal corresponds to a non-reserved first programmable command signal recognized by the media content access device; and
a navigation key associated with a second command signal that can be communicated from the control device to the media content access device upon activation of the navigation key and wherein the second command signal corresponds to a non-reserved second programmable command signal recognized by the media content access device;
displaying an icon provided by the electronic media content stored on a removable disc that shares a property of the direct-select key and that is dynamically associated with an operation of the media content access device;
performing a direct-selection operation with the media content access device if the first command signal is detected by the media content access device as a result of activation of the direct-select key on the remote control device; and
performing a navigation operation with the media content access device to navigate to a desired portion of the electronic media content if the second command signal is detected by the media content access device as a result of activation of the navigation key on the remote control device, wherein the electronic media content stored on a removable disc includes at least one of a graphic, a shape, a color, text, and audio data.

13. The method of claim 12, wherein the direct-select operation comprises one of accessing a menu, accessing a media asset, changing a setting, and navigating to a portion of the electronic media content.

14. The method of claim 12, wherein the navigation operation comprises one of a back operation to a prior section of content, a repeat operation to a beginning of a current section of content, a forward operation to a next section of content, and a home operation to activate a prior level menu.

15. The method of claim 12, wherein the property is at least one of a shape and a color.

16. The method of claim 12, wherein the direct-select operation and the navigation operation are implemented with machine instructions that conform to a digital versatile disc (DVD) specification.

17. The method of claim 12, further comprising dynamically associating the icon with a different operation of the media content access device after the direct-select operation is performed.

18. The method of claim 12, further comprising detecting an additional command signal before performing one of the direct-select operation and the navigation operation.

19. The method of claim 12, further comprising:
displaying instructions to a user to enter a code value with the remote control device to set the remote control device to transmit the first command signal and the second command signal in conformance with the media content access device;
detecting a test command signal from the remote control device within a predefined period; and
providing a success message to the user if the test command signal is detected within the predefined period.

20. A machine readable medium storing data and instructions that cause a media content access device to perform the operations of:
displaying an icon provided by an electronic media content stored on the machine readable medium that shares a property of a direct-select key of a control device, wherein the electronic media content stored on the machine readable medium includes at least one of a graphic, a shape, a color, text, and audio data;
dynamically associating the icon with a direct-select operation associated with the electronic media content stored on the machine readable medium;
performing the direct-select operation with the media content access device if a first command signal is detected by the media content access device as a result of activation of the direct-select key on the control device; and performing a navigation operation with the media content access device to navigate to a desired portion of the electronic media content stored on the machine readable medium if a second command signal is detected by the media content access device as a result of activation of a navigation key on the control device.

* * * * *